US012734770B2

(12) United States Patent
Le Moigne et al.

(10) Patent No.: US 12,734,770 B2
(45) Date of Patent: Sep. 15, 2026

(54) FIBER APPLICATION MACHINE PROVIDED WITH A TENSION LIMITING SYSTEM

(71) Applicant: CORIOLIS GROUP, Queven (FR)

(72) Inventors: Kevin Le Moigne, Quimper (FR); Emmanuel Le Meneah, Clohars Carnoët (FR)

(73) Assignee: CORIOLIS GROUP, Queven (FR)

( * ) Notice: Subject to any disclaimer, the term of this patent is extended or adjusted under 35 U.S.C. 154(b) by 173 days.

(21) Appl. No.: 18/723,837

(22) PCT Filed: Dec. 16, 2022

(86) PCT No.: PCT/FR2022/000134
§ 371 (c)(1),
(2) Date: Jun. 24, 2024

(87) PCT Pub. No.: WO2023/118671
PCT Pub. Date: Jun. 29, 2023

(65) Prior Publication Data

US 2025/0050599 A1 Feb. 13, 2025

(30) Foreign Application Priority Data

Dec. 23, 2021 (FR) ...................................... 2114113

(51) Int. Cl.

| | |
|---|---|
| ***B29C 70/56*** | (2006.01) |
| ***B29C 70/38*** | (2006.01) |
| ***B33Y 10/00*** | (2015.01) |
| ***B33Y 30/00*** | (2015.01) |

(52) U.S. Cl.
CPC ............ *B29C 70/56* (2013.01); *B29C 70/384* (2013.01); *B33Y 10/00* (2014.12); *B33Y 30/00* (2014.12)

(58) Field of Classification Search
None
See application file for complete search history.

(56) References Cited

U.S. PATENT DOCUMENTS

2009/0229760 A1* 9/2009 Hamlyn ................ B29C 70/384
156/433

FOREIGN PATENT DOCUMENTS

| | | |
|---|---|---|
| DE | 102012218178 | 11/2013 |
| WO | 2006092514 | 9/2006 |

OTHER PUBLICATIONS

International Search Report with English Translation corresponding to PCT/FR2022/000134, dated Mar. 7, 2023.
International Written Opinion corresponding to PCT/FR2022/000134, dated Mar. 7, 2023.

* cited by examiner

*Primary Examiner* — Abbas Rashid
*Assistant Examiner* — Adrianna N Konves
(74) *Attorney, Agent, or Firm* — CUSHMAN PARTNERS, LLC

(57) ABSTRACT

A fiber application machine comprising a fiber application head, storage means, conveying means, a displacement system, and a tension limiting system comprising at least one first cylinder and at least one second cylinder cantilever mounted on a support structure, and drive means for driving the cylinders in rotation. The first cylinder and/or the second cylinder are mounted mobile on the support structure between at least one active position in which each fiber is able to be partially wound on the cylinders, and an inactive position in which the first cylinder and the second cylinder are spaced apart from each other.

14 Claims, 4 Drawing Sheets

FIBER APPLICATION MACHINE PROVIDED WITH A TENSION LIMITING SYSTEM

CROSS-REFERENCE TO RELATED APPLICATIONS

This application is a U.S. National Phase application of PCT/FR2022/000134, filed Dec. 16, 2022, which claims priority to French Application No. 2114113, filed Dec. 23, 2021, and which applications are incorporated herein by reference.

The present invention relates to a fiber application machine provided with a particular tension limiting system, as well as to a method for producing composite material parts by means of such a machine.

It is known, in particular in patent WO2006/092514, fiber application or lay-up machines for the automatic lay-up on a lay-up surface, such as the surface of a male or female mold, of a wide band formed of one or more fibers, in particular flat continuous fibers of the ribbon type, commonly called tows, in particular carbon fibers consisting of a multitude of carbon threads or filaments.

These machines typically comprise a fiber application head having guide means for guiding the fiber or fibers towards the lay-up surface. These machines also include fiber storage means, such as a remote spool creel, and conveying means for conveying fibers from said storage means towards the head, and a displacement system able, for example, to displace the head relative to the lay-up surface. In the case of a band formed of several fibers, the guide means of the head enable the fibers to be brought towards the lay-up surface in the form of a band, in which the fibers are arranged substantially parallel edge to edge. For a lay-up in contact of the fibers, these machines, classically called fiber placement machines, comprise a head provided with a compaction roller intended to come into contact against the lay-up surface to apply the band, the guide means guiding the fibers towards the roller in the form of a band. The conveying means may comprise flexible tubes, each flexible tube is adapted to receive a fiber in its internal passage and is preferably provided with at least one longitudinal flexible blade, said flexible blade being arranged substantially parallel to the plane of transport of the fiber received in the internal passage of the flexible tube. Flexible tubes of this type are simple to design, take up little space and reduce costs, making it possible to obtain high moving speeds, to offset the storage means from the displacement system, to isolate the fibers from the outside, and to simplify the displacement system of the application head, in particular to use a displacement system such as a polyarticulated arm of the standard six-axis robot type.

In order to limit the tension in the fiber, it was proposed in the above-mentioned patent document to provide at least one tension limiting system, arranged between the fiber storage means and the application head, the said tension limiting system comprising at least two cylinders parallel to each other, on which a plurality of fibers are able to be partially wound, and drive means for driving the said cylinders in rotation at substantially the same speed. The said drive means area controlled by a machine control unit, so that the peripheral speeds of the cylinders are greater than the fiber moving speeds, at the application roller, in order to exert a tensile force on the fibers coming from the storage means, so as to limit the fiber take-up tension at the application roller to a substantially constant value, whatever the fiber moving speed. Some fibers, because of their fragility, elasticity or lightness, cannot be in direct contact with the rotating cylinders. To use these fibers, in particular fibers pre-impregnated with thermosetting resin, belts are mounted around each cylinder of the tension limiting system, so that a belt is interposed between each fiber and the cylinder, each belt being able to adhere to a fiber and to be driven to a greater or lesser extent by the cylinder depending on the pressure exerted by the fiber on the belt, said pressure being proportional to the take-up tension on the fiber.

Such a tension limiting system makes it possible to unwind several spools or several balls of fibers with a single control system, for fibers travelling at different speeds at the application head. The tension limiting system enables the tension of the fibers to be reduced at the roller regardless of their speed. Such a tension limiting system is particularly effective, simple in design, space-saving and low in cost.

However, maintenance operations on the tension limiting system, as well as the passage of fibers between the different cylinders when loading the machine with spools or following the breakage of a fiber, can be long and fastidious. In addition, during prolonged stoppages of the machine, the fibers may tend to adhere to the cylinders, or to the belts when the said cylinders are equipped with such belts, making it difficult to restart the machine. Furthermore, in the case of a tension limiting system provided with belts, the belts may tend to wear out, particularly the belts fitted to the first cylinders at the system's inlet. Replacing them requires time-consuming and fastidious dismantling of the tension limiting system.

The aim of the present invention is to propose a solution to overcome at least one of the aforementioned disadvantages.

To this end, the present invention proposes a fiber application machine comprising

- a fiber application head comprising an application roller and guide means able to guide at least one fiber onto the said application roller,
- fiber storage means
- conveying means for conveying at least one fiber from said storage means to the application head,
- a displacement system able to effect a relative displacement of the application head with respect to a lay-up surface, for example the surface of a mold, and
- at least one tension limiting system, arranged between the fiber storage means and the application head, comprising at least two cylinders parallel to each other, on which each fiber is able to be partially wound, and drive means for driving the said cylinders in rotation, substantially at the same speed, the said drive means being controlled by a control unit of the machine, so that the peripheral speeds of the cylinders are greater than the moving speeds of the fiber or fibers, characterized in that the tension system comprises at least one first cylinder and at least one second cylinder cantilever-mounted on a support structure between which each fiber is able to pass, the first cylinder and/or the second cylinder being mounted mobile on the support structure between at least one active position in which each fiber is able to be wound partially onto the said cylinders, and an inactive position in which the first cylinder and the second cylinder are separated from each other, for the passage of the fiber or fibers into the tension limiting system.

According to the invention, the cylinders can be spaced apart in an inactive position to

- facilitate the passage of fibers between the cylinders of the tension limiting system before the tension limiting system is used, limit or even eliminate contact between the fibers and the cylinders when the machine is not in use, and thus avoid the risk of fibers sticking directly or indirectly to the cylinders during prolonged stoppage of the machine, and facilitate maintenance operations on the tension limiting system, in particular its cleaning, for example the removal of fibrils, the cleaning of cylinders, or the cleaning or replacement of belts mounted on the cylinders and interposed between the cylinders and the fibers, as described below.

The tension limiting system is advantageously used in a machine with storage means remote from the head, in which the distance between the fiber spools and the head is relatively high. It can also be integrated into a machine in which the fiber storage means are mounted on the head.

One or more tension limiting systems may be arranged between the fiber storage means and the application head. A tension limiting system in accordance with the invention can be positioned at the storage means, preferably at the outlet of the storage means, and/or interposed on the conveying means, for example along the arm of a robot, and/or at the inlet of the application head, in the latter case the tension limiting system can be mounted at the end of the robot, or integrated into the application head.

The number of cylinders, the diameter of the cylinders, and the contact angular portions over which each fiber comes into contact, directly or indirectly, with the cylinders will be defined by the take-up tension desired at the application roller and according to space constraints.

The machine can be designed for the lay-up of a single fiber or for the lay-up of a bundle of fibers in which the fibers are arranged side by side, in particular substantially edge to edge. In the case of several fibers, the fibers are partially wound on each cylinder, being offset from one another along each cylinder.

In an embodiment, the first cylinder(s) and the second cylinder(s) are mounted displaceable, preferably in translation, on the support structure between at least one active position and an open position. In this embodiment, the cylinders are maneuvered between the active position and the inactive position by displacing both the first cylinders and the second cylinders so as to move them away from or towards each other, which facilitates the passage of the fibers through the tension limiting system, as well as the maintenance operations, and ensures that the fibers are not in contact with the cylinders in the inactive position.

According to an embodiment, the tension limiting system comprises means for blocking the fiber(s), preferably at least downstream of the cylinders in relation to the travel direction of the fibers, able to block the fiber(s) when the cylinders are in the inactive position. The blocking of the fibers makes it possible to limit or even eliminate fiber displacements when the cylinders are in the inactive position, and thus to avoid excess lengths of fiber in the systems upstream and/or downstream of the tension limiting system, which could cause problems during subsequent lay-up, in particular twists in the fibers and/or incorrect positioning of the fibers on return pulleys, for example.

According to an embodiment, the tension limiting system comprises downstream blocking means and upstream blocking means arranged respectively downstream and upstream of the cylinders with respect to the travel direction of the fiber(s), able to block the fiber(s) when the cylinders are in the inactive position. The blocking of the fibers upstream and downstream of the tension limiting system ensures correct positioning of the fibers both upstream and downstream of the tension limiting system when the cylinders are in the inactive position, and thus avoids problems with fiber conveying when the machine is restarted.

According to an embodiment, the tension limiting system comprises tensioning means, arranged between the upstream blocking means and the downstream blocking means, at the inlet or outlet of the cylinders, able to be displaced into an active position in order to tighten the fiber or fibers when the cylinders are in the inactive position. The use of such tensioning means guarantees correct positioning of the fibers on the cylinders when the cylinders are maneuvered from their inactive position to their active position, as well as correct positioning of the fibers in the inactive position, without contact with the cylinders. Preferably, the tension limiting system comprises an upstream return system and a downstream return system arranged respectively upstream and downstream of the cylinders, over which the fiber or fibers pass, the tensioning means, formed by a tensioning roller, being arranged for example downstream of the cylinders, between the downstream return system and the downstream blocking means.

According to an embodiment, the first cylinder(s) and/or the second cylinder(s) are mounted mobile in translation between an open position and an extreme active position, and are able to be arranged in one or more intermediate active positions, selected depending on the desired angular portions of contact between the fibers and the cylinders. According to the invention, it is possible to adjust the angular portions of contact between the fibers and the cylinders, depending on the nature of the fibers used, and thus adapt the tension limiting system to requirements.

According to an embodiment, at least at the inlet of the tension limiting system, the cylinders are arranged in such a way that, in the active position, the angular portions of contact over which the fibers come into contact, directly or indirectly, with the cylinders, increase from upstream to downstream, relative to the travel direction of the fiber or fibers being applied. In this embodiment, at least on the first set of cylinders on which the fibers come into contact, the contact angular portion increases from one cylinder to another from upstream to downstream, in order to better distribute the phenomenon of elimination of tension from the fibers on the different cylinders, and thus to avoid premature wear of the first cylinders on which the fibers pass, and in particular of the belts when said cylinders are equipped with such belts.

According to an embodiment, for each fiber, a belt is mounted around each cylinder, so that a belt is interposed between each fiber and the cylinder, each belt being able to adhere to a fiber and to be driven to a greater or lesser extent by the cylinder depending on the pressure exerted by the fiber on the belt, preferably each belt is mounted in a loop on a sliding path formed in part by the cylinder and a complementary part, in order to limit the angular portion of contact between the belt and the cylinder, the angular portion of contact between a fiber and a belt being less than or equal to the angular portion of contact between the belt and the cylinder, in the form of a crescent moon, fixedly mounted around the cylinder, so that end parts of the said complementary part fit tangentially onto the cylinder, each belt being mounted around the circular peripheral surface of an intermediate part and on the circumferential portion of the cylinder not covered by the said disc, guide flanges, generally C-shaped, being able to be mounted snap-fitting onto the cylinder and the intermediate part so that each fiber and each belt are guided between two flanges, each flange comprising at each end at least one tab able to snap-fit elastically into a recess in the intermediate part. In this embodiment, the flanges can be easily dismantled for replacement or to enable the belts to be replaced.

According to an embodiment, each first cylinder and each second cylinder is equipped with a toothed wheel, the drive system comprises a single drive motor, a double-toothed belt able to mesh on a pinion of said drive motor and on each toothed wheel, and a tensioning system able to tighten the double-toothed belt when the first cylinder(s) and/or the second cylinder(s) are displaced from their active position to their inactive position. According to one embodiment, the tensioning system is formed by the motor mounted mobile in translation on the support structure, and whose displacement is obtained by a jack.

The present invention also relates to a method for manufacturing a composite material part comprising the application of continuous fibers to an application surface, characterized in that the fibers are applied by means of a fiber application machine as defined above, by relative displacement of the application head with respect to the lay-up surface along lay-up paths.

The invention will be better understood, and other purposes, details, features and advantages will become clearer in the course of the following detailed explanatory description of a presently preferred particular embodiment of the invention, with reference to the appended schematic drawings, in which.

Figure 1:
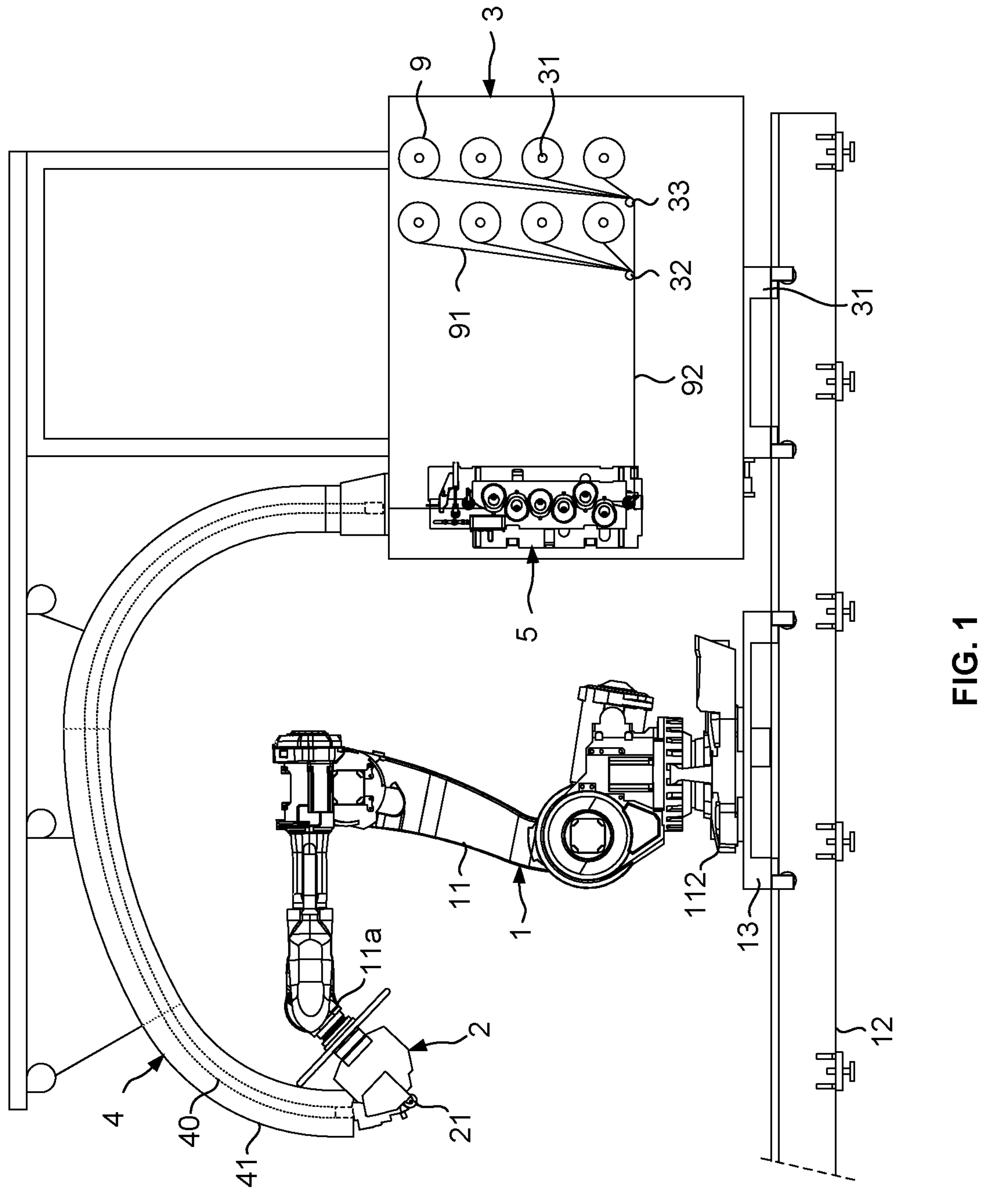
FIG. 1 is a schematic side view of a fiber application machine according to the invention, comprising a tension limiting system placed in the creel.

With reference to FIG. 1, the application machine comprises a displacement system 1 formed by a polyarticulated arm 11, of the six-axis robot type, known per se, mounted mobile on a linear axis 12, an application head 2 mounted at the end wrist 11*a* of the polyarticulated arm, fiber storage means 3, and conveying means 4 for conveying fibers from the said storage means to the application head.

The polyarticulated arm 11 is fixed by its base 112 to a carriage 13 slidably mounted on the linear axis 12, said linear axis consisting of two parallel rails 121 fixed to the floor. The carriage is equipped with drive means, for example motorised rollers, controlled by a control unit for moving the placement head along these rails.

The fiber application head 2, also known as fiber placement head, comprises an application roller 21 able to come into contact with a mold in order to apply a band formed of several fibers, for example pre-impregnated with resin. The machine is designed for the application of flat continuous fibers, of the ribbon type, for example carbon fibers, packaged in the form of spools. The storage means consist of a creel, schematically shown as reference 3, for receiving the fiber spools 9. The creel is also mounted on a follower carriage 31, arranged on rails 121 and mechanically connected to the carriage 13 carrying the robot. The machine is designed here to lay-up bands of eight fibers, the creel comprising eight mandrels 31, which may be motorised, to receive eight fiber spools 9. In a manner known per se, the creel may comprise an oscillating roller or pulley over which the fiber passes, enabling the rotation of the mandrel to be controlled as a function of the position of the oscillating roller. Similarly, a secondary mandrel may be associated with each mandrel for rewinding any separator film as the fiber is unwound.

The conveying means comprise flexible conveying tubes equipped with flexible stiffening blades. The fibers are conveyed individually in these conveying tubes from the creel 3 to the fiber placement head 2. The tubes are gathered into a bundle, shown schematically as reference 40 in FIG. 1, and are placed in the internal passage of a flexible sheath 41.

Figure 2:
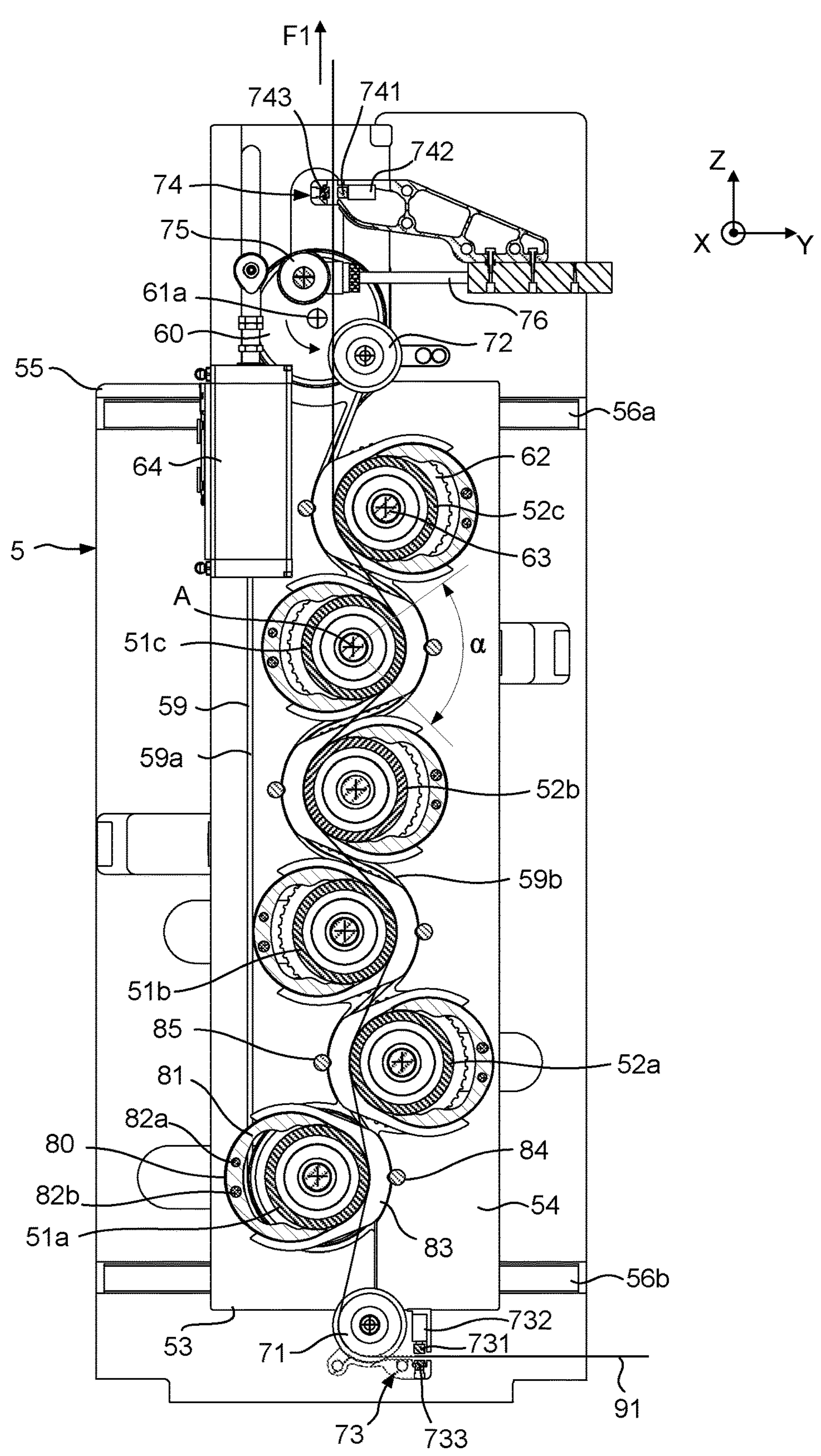
FIG. 2 is a schematic cross-sectional view of the tension limiting system, with the cylinders in an extreme active position; and, FIG. 3 and FIG. 4 are schematic cross-sectional views of the tension limiting system, similar to that of FIG. 2, in which the cylinders are in an open position and in an intermediate active position respectively.
Figure 3:
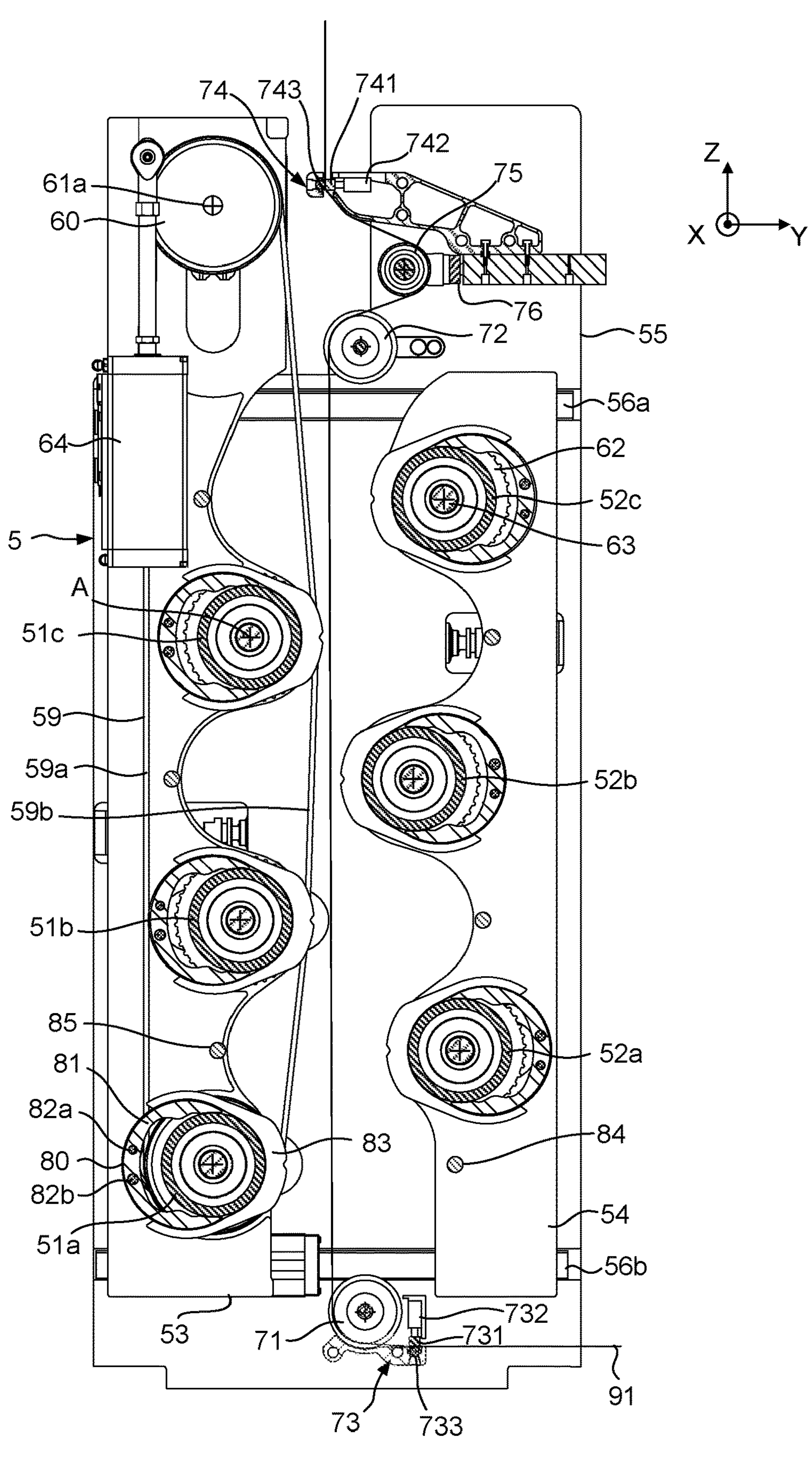
Figure 4:
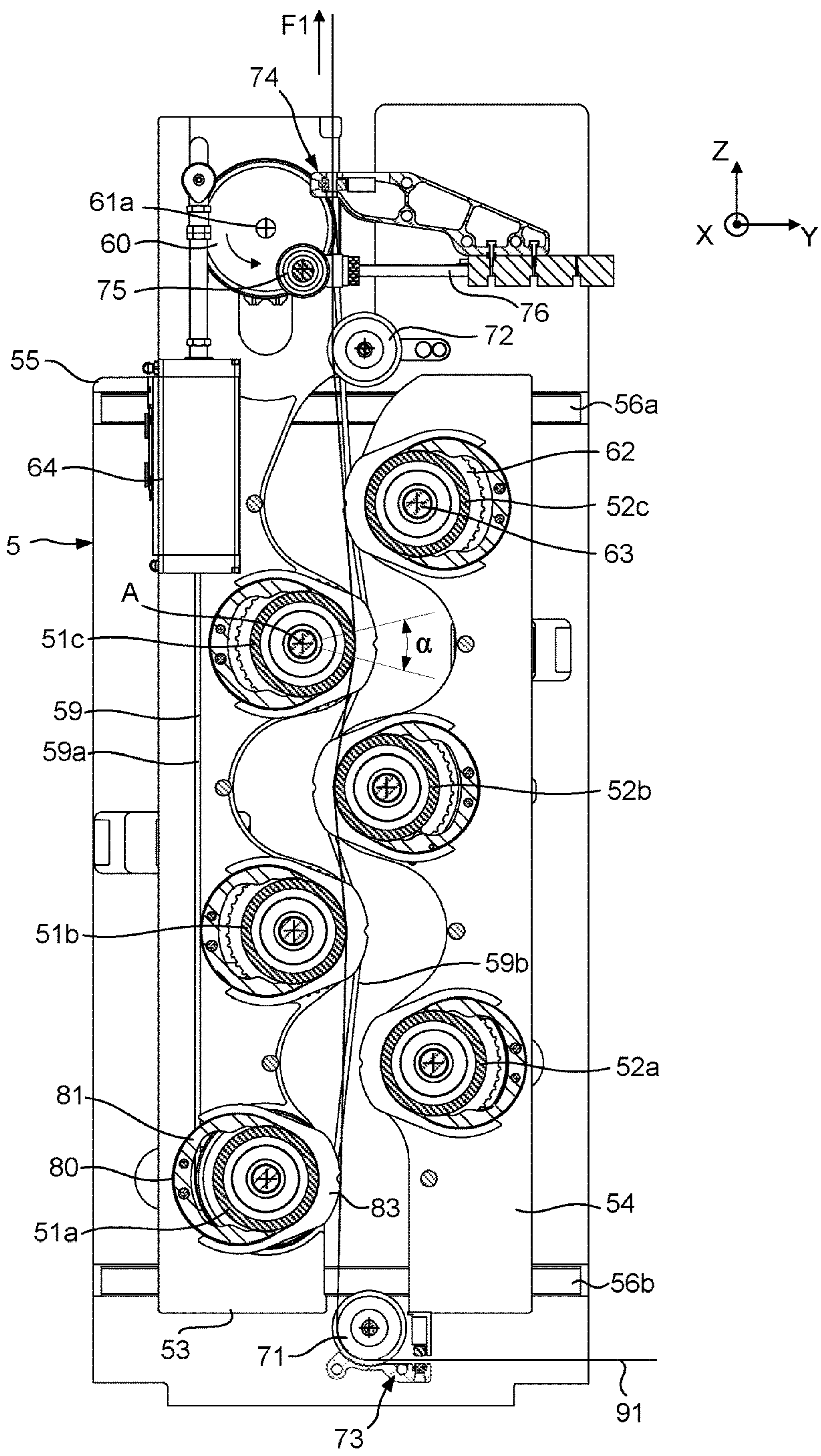

According to the invention, the machine is equipped with a tension limiting system 5 to exert a tensile force on the fibers coming from the spools and thus limit the take-up tension of the fibers at the application roller 21. In the present embodiment, the tension limiting system is located in the creel. The fibers unwound from the spools are gathered together via return pulleys 32, 33 in the form of a bundle 92 in which the fibers are arranged side by side, the bundle of fibers passing through the tension limiting system before entering the conveying tubes. FIGS. 2 to 4 show longitudinal cross-sections of the tension limiting system at the level of a fiber 91 of the bundle 92.

With reference to FIGS. 2 and 3, the tension limiting system comprises a set of motorised cylinders, mounted so as to rotate around rotation axes A, parallel to a first axis X. The system comprises first cylinders 51*a-c* rotatably mounted on a first support plate 53 and second cylinders 52*a-c* rotatably mounted on a second support plate 54, the fiber bundle 91 passing between the first cylinders and the second cylinders. In the illustrated embodiment, the system comprises three first cylinders respectively referenced, from upstream to downstream with respect to the travel direction F1 of the fibers, 51*a*, 51*b* and 51*c*, and three second cylinders respectively referenced from upstream to downstream 52*a*, 52*b*, 52*c*.

The first support plate 53 and the second support plate 54 are mounted mobile in translation one next to the other on a support structure 55 along a second axis Y, perpendicular to the first axis X. In the present embodiment, the X and Y axes are horizontal axes. The Z axis, which is perpendicular to the X and Y axes, is therefore a vertical axis. For this assembly, the two support plates are slidably mounted on two rails 56*a*, 56*b* connected to the support structure. The two support plates are displaceable by motorisation means (not shown), comprising for example a single jack for the two support plates, between a first closed position illustrated in FIG. 2, in which the first and second cylinders are in an extreme active position, and a second open position illustrated in FIG. 3 in which the cylinders are in an inactive position.

The first cylinders and the second cylinders are mounted offset from each other in the Z direction on their respective support plate, so that in the extreme active position of the cylinders, each fiber is able to come into contact by a first main face against the first cylinders and by a second main face against the second cylinders. Each fiber alternately comes into contact with a first cylinder and then a second cylinder. Each fiber thus rests successively against cylinders 51*a*, 52*a*, 51*b*, 52*b*, 51*c* and 52*c*.

Each fiber is in contact with a cylinder directly, or indirectly via a belt interposed between the cylinder and the fiber as described below, over an angular portion $\alpha$ of contact which may be identical or different from one cylinder to another.

In the present embodiment, the positioning in the Y direction of the first cylinders on the first support plate and of the second cylinders on the second support plate is defined so that, at least on a first set of successive cylinders, the angular portions α increase from upstream to downstream, relative to the travel direction of the fiber. By way of example, in the illustrated embodiment, the angular portions increase on the first four cylinders 51*a*, 52*a*, 51*b*, 52*b* and then decrease from the fourth to the sixth cylinders 52*b*, 51*c*, 2*c*. For example, the cylinders 51*a*, 52*a*, 51*b*, 52*b*, 51*c* and 52*c* have a contact angular portion of approximately 25°, 35°, 65°, 90°, 80° and 35° respectively. Alternatively, the contact angular portions increase, for example, on the first three cylinders 51*a*, 52*a*, 51*b*, then remain substantially constant for the next two cylinders 52*b*, 51*c*, and decrease between the penultimate and last cylinders 51*c*, 52*c*.

The rotational drive of the cylinders in their extreme active position is performed by a single drive motor (not shown) arranged on the side of the support structure opposite the cylinders, the shaft 61 of which is equipped with a pinion 60, a double-toothed belt 59 meshing with said pinion 60 and with a toothed wheel 62 associated with each cylinder. Each cylinder is mounted so as to rotate with an axial rod 63, of axis A, mounted so as to rotate in a cantilevered manner on a support plate. A toothed wheel 62 is assembled on the axial rod, between the cylinder and the support plate. The drive motor is mounted on the first support plate 53, for example at the upper part. The belt 59 has a first forward strand 59*a* extending freely from the pinion 60 to the toothed wheel associated with the first cylinder 51*a* at the inlet of the tension limiting system, and has a second return strand 59*b* which extends from said first cylinder 51*a* towards the pinion between the first cylinders and the second cylinders and which, in the extreme active position of the cylinders, passes over the toothed wheels associated with the first cylinders 51*b*, 51*c* and the second cylinders 52*a*, 52*b*, 52*c*. The belt meshes by its inner toothed face with the pinion and the toothed wheels associated with the first cylinders, and by its outer toothed face with the toothed wheels associated with the second cylinders. The motor drives the pinion anticlockwise, so that the first cylinders are driven anticlockwise and the second cylinders are driven clockwise.

To hold the belt 59 when the support plates are moved to the open position, and to ensure that the belt is correctly positioned on the toothed wheels in the closed position, the motor is mounted so that it can slide in the Z direction, and can be moved in translation by a jack 64 to move the drive motor away from the first cylinder as the support plates are moved to the open position, as shown in FIG. 3, and thus tighten the belt. In the open position, the belt meshes only with the toothed wheels of the first cylinders.

The drive motor is controlled by the machine control unit so that the peripheral speed of the cylinders is greater, for example by approximately 10%, than the moving speed of the fibers at the application roller 21 during lay-up operations. For example, the cylinders are driven at a constant speed from the moment the machine is switched on, which is determined depending on the programmed lay'up sequences.

At the inlet to the cylinders, the system comprises an upstream return system 71, mounted on the support structure 55, upstream of the cylinders in relation to the travel direction F1 of the fibers, formed by a set of pulleys, comprising one pulley per fiber, rotatably mounted on the same rotation axis parallel to the X axis. At the outlet of the cylinders, a downstream return system 72 is mounted on the support structure, downstream of the cylinders, formed by a set of pulleys, comprising one pulley per fiber, rotatably mounted on the same rotation axis parallel to the X axis.

Upstream of the upstream return system 71 with respect to the travel direction F1 of the fibers, the tension limiting system comprises an upstream blocking system 73 able to block each fiber of the bundle. The upstream blocking system comprises a blocking bar 731 mounted at the end of the rod of at least one blocking jack 732. The blocking bar has a flat bearing surface perpendicular to the jack rod. The jack is able to displace the blocking bar between an inactive position and an active position to block the fibers. In the active position, the support surface of the blocking bar abuts against a counter-tool 733 to clamp the fibers. In the inactive position, the blocking bar is moved away from the counter-tool. The counter-tool can be formed by a common bar for all the fibers, or preferably by one stud per fiber. Advantageously, each stud is mounted so as to be elastically movable in a direction parallel to the blocking jack rod, for example by means of an elastic washer, so that the blocking system can block fibers of different thicknesses, and in particular make it possible to block a fiber in a so-called splicing zone of a fiber having a double thickness.

Downstream of the downstream return system 72, the tension limiting system comprises a downstream blocking system 74, able to block each fiber of the bundle, including a blocking bar 741 mounted at the end of the rod of at least one blocking jack 742, and movable between an inactive position and an active position in which the blocking bar comes into abutment against a counter-tool 743 for clamping the fibers, the counter-tool preferably comprising one blocking stud per fiber, mounted elastically to adapt to different fiber thicknesses.

A tensioning roller 75 is mounted, between the downstream return system 72 and the downstream blocking system 74, at the end of the rod of a jack 76 and can be moved in translation along the Y axis between an inactive position shown in FIG. 2 and an active position shown in FIG. 3 to tighten the fibers when the support plates are in the open position. Alternatively, the tensioning roller is replaced by a set of individual pulleys rotatably mounted on a single axial rod which can be moved in translation by the cylinder, each fiber passing over a pulley.

Preferably, each cylinder is equipped with belts 80 interposed between the fibers and the cylinder. Each belt is mounted around the cylinder and a complementary part or guide shoe 81 fixedly mounted on the support plate on which the cylinder is mounted. In cross-section, the guide shoe has the general shape of a crescent moon, with a radius greater than that of the cylinder, provided with a recess suitable for mounting the shoe around the cylinder, without contact between the shoe and the rotating cylinder, with its end portions fitting tangentially onto the cylinder. The shoe has two through-passages for its mounting on two bars 82*a*, 82*b* cantilever-mounted on the support plate. A single guide shoe can be provided for all the fibers. The belts 80 are mounted on the circular peripheral edge of the shoe 81 and on the 20 circumferential portion of the cylinder not covered by the shoe, defined between the two end portions of the shoe.

To ensure lateral guidance of the belts and fibers, flanges 83 are mounted on the cylinder and the guide shoe. Each flange, for example made of plastic, is generally C-shaped, with a base whose inner edge has a radius of curvature substantially corresponding to the radius of the cylinder, and two arms. Each flange is snapped onto the cylinder, on the side opposite the shoe, its arms being inserted into grooves formed in the end portions of the shoe, said arms having pins which snap-fit, by elastic deformation of the arms, in corresponding recesses provided in the bottom wall of the grooves in the shoe. Each belt is arranged between two flanges. This system of flanges being mounted by snap-fitting on the shoe allows easy removal of the flanges, in particular in the open position of the support plates, notably for their replacement in the event of wear, or for the replacement of the belts.

Preferably, for each first cylinder mounted on the first support plate, a blocking rod 84 is provided, mounted as a cantilever on the second support plate, parallel to the X axis, against which the flanges associated with said first cylinder come into abutment by their base in the closed position of the support plates to block the flanges on the cylinder and its associated guide shoe, and guarantee the positioning of each fiber between its two flanges. Similarly, the first support plate carries blocking rods 85 able to block the flanges associated with the second cylinders in the closed position of the support plates.

Alternatively, to facilitate assembly, for each cylinder, several shoes are fitted onto the bars 82*a*, 82*b*. For example, two shoes are fitted one behind the other on the bars, each shoe being designed for four fibers.

In operation, during lay-up operations, the fibers of the bundle pass successively into the upstream blocking system 73, between the blocking bar 731 in the inactive position and the counter-tool 732, onto the upstream return pulleys 71, between the first cylinders 51*a-c* and the second cylinders 52*a-c* in the extreme active position, then into the downstream blocking system, between its blocking bar 741 in the inactive position and its counter-tool 742. In this extreme active position, the fibers do not come up against the downstream return pulleys 72, or are only flush with them. For each cylinder and for each fiber, in the absence of tension on a fiber, the belt is in sliding contact with the cylinder. When a fiber is subjected to a take-up tension at the application roller, the fiber exerts a pressure on the belt, the latter is then driven in rotation by the cylinder, thus driving the fiber which adheres to the belt.

The cylinders can be moved to the inactive position shown in FIG. 3, by displacing the support plates 53, 54 to the open position, in order to carry out maintenance operations on the tension limiting system, in particular cleaning the belts and/or cylinders. The cylinders will also be moved to the inactive position during a prolonged interruption of the machine between two lay-up phases to prevent 25 the fibers sticking to the belts, or during the initial passage of the fibers from the spools to the head. Before the support plates are moved from the closed position to the open position, the cylinders 732, 742 of the upstream and downstream blocking systems are controlled to move the blocking bars 731, 741 into the active position to block the bundle of fibers upstream and downstream of the cylinders. As the support plates move towards their open position, the drive motor is moved upwards by the jack 64 to take up the excess length of belt that passed over the toothed wheels 62 of the second cylinders and thus keep the belt taut. Similarly, as the support plates move towards their open position, the tensioning roller 75 is moved by the jack 76 towards its active position to take up the excess lengths of fiber that passed over the first and second cylinders. In the open position, the fibers are thus tensioned vertically between the upstream and downstream return systems, without coming into contact with the belts on the cylinders.

When the cylinders are brought to the inactive position to effect the initial passage of the fibers from the spools to the head, the blocking bars of the blocking systems will be brought to the inactive position.

To bring the cylinders back to their extreme active position, the support plates are displaced to their closed position. As they are displaced, the drive motor moves downwards and the tensioning roller moves to its inactive position. Once the plates are in the closed position, the blocking bars are moved to their inactive position to unblock the fibers of the bundle.

The jack 64 is preferably of the pneumatic type and is supplied with compressed air at a pressure corresponding to a given belt tension. Jack 76 can be a pneumatic jack of the same type, supplied with compressed air when the support plates move to their open position at a pressure corresponding to a given fiber tension.

In one embodiment, the support plates can be brought to different intermediate positions between their closed position and their open position, corresponding to different intermediate active positions of the cylinders to adapt the contact angular portions according to the type of fiber used. FIG. 4 illustrates an intermediate active position of the cylinders used, for example, for fibers pre-impregnated with a thermoplastic resin. In this example, the fibers come successively into contact only against the cylinders referenced 51*b*, 52*b* and 51*c*, over smaller angular portions. In this intermediate active position, on exiting the last cylinder 52*c*, the fibers pass over the downstream return system 72 to be redirected vertically into the downstream blocking system 74.

Although the invention has been described in relation to a particular embodiment, it is quite clear that it is by no means limited thereto and that it includes all the technical equivalents of the means described as well as their combinations if these fall within the scope of the invention as defined in the claims.

The invention claimed is:

1. A fiber application machine comprising:
- a fiber application head;
- a fiber storage creel;
- at least one fiber guide configured to guide at least one fiber from said fiber storage creel to the fiber application head;
- a displacement system able to effect a relative displacement of the fiber application head with respect to a lay-up surface;
- at least one tension limiting system comprising at least two cylinders parallel to each other, on which each fiber is able to be partially wound, and
- a motorized drive assembly configured to drive said at least two cylinders in rotation,
- wherein the at least one tension limiting system comprises at least one first cylinder and at least one second cylinder cantilever-mounted on a support structure, the at least one first cylinder and/or the at least one second cylinder being mounted mobile on the support structure between at least one active position in which each fiber is able to be partially wound on said at least one first cylinder and said at least one second cylinder, and an inactive position in which the at least one first cylinder and the at least one second cylinder are spaced apart from each other.

2. The fiber application machine according to claim 1, wherein the at least one first cylinder and the at least one second cylinder are mounted displaceable in translation on the support structure between at least one active position and an open position.

3. The fiber application machine according to claim 1, wherein the at least one tension limiting system comprises a fiber blocking device comprising a bar and configured to block the fiber or fibers when the at least one first and second cylinders are in the inactive position.

4. The fiber application machine according to claim 3, wherein the at least one tension limiting system comprises downstream blocking device and upstream blocking device arranged respectively downstream and upstream of the at least one first and second cylinders with respect to a travel direction of the fiber or fibers, able to block the fiber or fibers when the at least one first and second cylinders are in the inactive position.

5. The fiber application machine according to claim 4, wherein the at least one tension limiting system comprises a fiber tensioning component arranged between the upstream blocking device and the downstream blocking device able to be displaced into an active position in order to tighten the fiber or fibers when the at least one first and second cylinders are in the inactive position.

6. The fiber application machine according to claim 1, wherein the at least one first cylinder and/or the at least one second cylinder are mounted mobile in translation between an open position and an extreme active position, and are able to be arranged in one or more intermediate active positions, selected depending on the desired angular portions (a) of contact between the fiber or fibers and the at least one first and second cylinders.

7. The fiber application machine according to claim 1, wherein, at least at the inlet of the at least one tension limiting system, the at least one first and second cylinders are arranged so that, in the active position, an angular portions of contact over which the fiber or fibers are in contact, directly or indirectly, with the at least one first and second cylinders, increase from upstream to downstream, with respect to a travel direction of the fiber or fibers.

8. The fiber application machine according to claim 1 wherein, for each fiber, a belt is mounted around each cylinder of the at least one first and second cylinders so that the belt is interposed between the fiber and the cylinder, each belt is mounted in a loop on a sliding path formed partly by the cylinder and a complementary part in the form of a crescent moon mounted fixedly around the cylinder, so that end parts of the said complementary part fit tangentially onto the cylinder, the belt being mounted around a circular peripheral surface of the complementary part and on the circumferential portion of the cylinder not covered by said complementary part, guide flanges generally C-shaped, being able to be mounted by snap-fitting on the cylinder and the complementary part so that the fiber and the belt are guided between two flanges, each flange comprising at each end at least one tab able to snap-fit elastically into a recess in the complementary part.

9. The fiber application machine according to claim 1, wherein each at least one first cylinder and each at least one second cylinder is equipped with a toothed wheel, the a motorized drive assembly comprising a single drive motor, a double-toothed belt able to mesh on a pinion of said drive motor and on each toothed wheel, and a tensioning system able to tighten the double-toothed belt when the at least one first cylinder and/or the at least one second cylinder are displaced from their active position to their inactive position.

10. A method for manufacturing a composite material part comprising the application of continuous fibers onto an application surface, wherein the application of fibers is carried out by means of a fiber application machine according to claim 1, by relative displacement of the application head with respect to the lay-up surface according to lay-up trajectories.

11. The fiber application machine according to claim 1, wherein the at least one fiber guide comprises a flexible tube.

12. The fiber application machine according to claim 11, wherein the flexible tube is provided with at least one longitudinal flexible blade.

13. The fiber application machine according to claim 1, wherein the motorized drive assembly comprises motorized rollers.

14. The fiber application machine according to claim 5, wherein the fiber tensioning component is a tensioning roller.

* * * * *